(12) United States Patent
Juel

(10) Patent No.: US 12,185,663 B2
(45) Date of Patent: Jan. 7, 2025

(54) ROBOTIC TOOL, AND METHODS OF NAVIGATING AND DEFINING A WORK AREA FOR THE SAME

(71) Applicant: HUSQVARNA AB, Huskvarna (SE)

(72) Inventor: Jonas Juel, Huskvarna (SE)

(73) Assignee: HUSQVARNA AB, Huskvarna (SE)

( * ) Notice: Subject to any disclaimer, the term of this patent is extended or adjusted under 35 U.S.C. 154(b) by 890 days.

(21) Appl. No.: 17/296,422

(22) PCT Filed: Dec. 10, 2019

(86) PCT No.: PCT/EP2019/084367
§ 371 (c)(1),
(2) Date: May 24, 2021

(87) PCT Pub. No.: WO2020/143972
PCT Pub. Date: Jul. 16, 2020

(65) Prior Publication Data
US 2022/0124973 A1    Apr. 28, 2022

(30) Foreign Application Priority Data
Jan. 8, 2019  (SE) .................................. 1950013-1

(51) Int. Cl.
*A01D 34/00* (2006.01)
*A01D 101/00* (2006.01)
(Continued)

(52) U.S. Cl.
CPC ......... *A01D 34/008* (2013.01); *G05D 1/0055* (2013.01); *G05D 1/0278* (2013.01); *H04W 4/40* (2018.02); *A01D 2101/00* (2013.01)

(58) Field of Classification Search
CPC .... A01D 34/00; A01D 2101/00; G01C 21/12; G01C 21/16; G01C 21/165;
(Continued)

(56) References Cited

U.S. PATENT DOCUMENTS 5,938,704 A    8/1999  Torii
5,944,132 A    8/1999  Davies et al.
(Continued)

FOREIGN PATENT DOCUMENTS

CN    103781602 A    5/2014
CN    104471966 A    3/2015
(Continued)

OTHER PUBLICATIONS

International Search Report and Written Opinion in the International Application No. PCT/EP2019/084367 mailed Mar. 9, 2020.
(Continued)

*Primary Examiner* — Anshul Sood
(74) *Attorney, Agent, or Firm* — Burr & Forman LLP

(57) ABSTRACT

A method of navigating a self-propelled robotic tool (14) within a work area (12) defined by a boundary (13) comprises determining a positioning status comprising a position (P) of the robotic tool (14) within the area; based on the determined position (P) of the robotic tool (14), estimating a boundary distance value indicative of a distance (D1, D2, D3) from the robotic tool (14) to the boundary (13); setting a maximum dead reckoning navigation distance based on the boundary distance value; if a new positioning status cannot be reliably obtained, continuing navigating the robotic tool (14) based on dead reckoning; and if no new positioning status of the robotic tool (14) within the area has been reliably obtained upon reaching the maximum dead reckoning navigation distance, executing a safety operation based on having reached the maximum dead reckoning navigation distance.

19 Claims, 8 Drawing Sheets

(51) Int. Cl.
   *G05D 1/00* (2024.01)
   *H04W 4/40* (2018.01)

(58) Field of Classification Search
   CPC .... G05D 1/0265; G05D 1/027; G05D 1/0278;
   G05D 2111/36
   See application file for complete search history.

(56) References Cited

U.S. PATENT DOCUMENTS

| | | | | |
|---|---|---|---|---|
| 2016/0278285 | A1* | 9/2016 | Reigo | B60L 1/003 |
| 2016/0334795 | A1* | 11/2016 | Reigo | A01D 34/008 |
| 2016/0349753 | A1* | 12/2016 | Tojima | G05D 1/027 |
| 2017/0120445 | A1 | 5/2017 | Reigo et al. | |
| 2017/0347521 | A1 | 12/2017 | Tjernberg et al. | |
| 2017/0357006 | A1* | 12/2017 | Öhrlund et al. | G01C 21/165 |
| 2018/0359916 | A1* | 12/2018 | Zhou | G01S 19/49 |

FOREIGN PATENT DOCUMENTS

| | | |
|---|---|---|
| CN | 106338989 A | 1/2017 |
| CN | 106489103 A | 3/2017 |
| CN | 107095622 A | 8/2017 |
| CN | 107885213 A | 4/2018 |
| CN | 107914271 A | 4/2018 |
| CN | 108142070 A | 6/2018 |
| CN | 108279004 A | 7/2018 |
| WO | 99/12793 A1 | 3/1999 |
| WO | 2016102141 A1 | 6/2016 |
| WO | 2018135988 A1 | 7/2018 |

OTHER PUBLICATIONS

Office Action and Search Report for Swedish Application No. 1950013-1 mailed on May 31, 2019.

* cited by examiner

ROBOTIC TOOL, AND METHODS OF NAVIGATING AND DEFINING A WORK AREA FOR THE SAME

FIELD OF THE INVENTION

The present invention relates to a robotic tool, to methods of navigating a robotic tool, to a method of defining a work area for a robotic tool, and to a computer program and a computer-readable medium implementing any of the methods.

BACKGROUND

Self-propelled robotic tools are widely used for performing maintenance operations within a predetermined work area. By way of example, robotic lawn mowers are used for autonomously cutting lawns within a predetermined work area to be mowed. Boundary wires are typically used for delimiting the work area, and the robotic lawn mower is typically configured to move in a randomly generated irregular pattern to ensure complete coverage of the working area. However, when the work area has an irregular or complex shape, some portions of the work area may be mowed less frequently than others, or not at all. Other exemplary considerations in lawnmower design are safety, cost, complexity, reliability, and ease of use. In particular, there is a need for a safe, reliable robotic tool providing a good surface coverage. WO15072897A1 discloses a systematic navigation method according to which a lawn mower navigates within a boundary wire defining an area to be mowed.

SUMMARY

It is an object of the present invention to solve, or at least mitigate, parts or all of the above mentioned problems. To this end, there is provided a method of navigating a self-propelled robotic tool within a work area defined by a boundary, the method comprising determining a positioning status of the robotic tool, the positioning status comprising a determined position of the robotic tool within the area; navigating the robotic tool based on the determined positioning status; determining that a new positioning status of the robotic tool within the area cannot be reliably obtained; based on the determined position of the robotic tool within the area, estimating a boundary distance value indicative of a distance from the robotic tool to the boundary; setting a maximum dead reckoning navigation distance based on the boundary distance value; continuing navigating the robotic tool based on dead reckoning; and if no new positioning status of the robotic tool within the area has been reliably obtained upon reaching the maximum dead reckoning navigation distance, executing a safety operation based on having reached the maximum dead reckoning navigation distance. Thereby, upon loss of a reliable positioning status, the robotic tool may be allowed to continue operation without exact knowledge of its current position, since it can be safely determined that it's nevertheless at least within the work area. As a result thereof, operation may be improved within work areas which are difficult to navigate. The order of the listing of method steps above does not define a required order of method steps. For example, the boundary distance value may be continuously estimated after each reliable determination of a positioning status. Alternatively, the boundary distance value may be determined based on the last reliably determined positioning status only after the determination that a new positioning status cannot be reliably obtained. The dead reckoning may be based on e.g. an odometer signal from wheels of the robotic tool, and/or from an accelerometer and/or gyroscope signal from a sensor or set of sensors of the robotic tool. According to embodiments, the maximum dead reckoning navigation distance may be set based also on an estimated positioning error. Determining that a new positioning status of the robotic tool within the area cannot be reliably obtained may comprise determining whether an estimated positioning error exceeds a limit error value, or determining whether a positioning signal has been received from a number of signal sources of at least a limit number of signal sources. For example, when navigating based on signals from a satellite navigation system, a position may be considered reliable if a positioning signal has been received from at least three satellites, allowing positioning on a two-dimensional map, or if a positioning signal is received from at least four satellites, allowing positioning in three-dimensional space. Hence, for a typical Global Navigation Satellite System, GNSS, the limit number may be e.g. at least three. The boundary distance value may e.g. be represented as a distance from the robotic tool to the boundary, or as a time required for the robotic tool to propel itself from its present position to the boundary at a certain speed. Alternatively, the boundary distance value may be represented as a Boolean, indicating only whether or not the distance from the robotic tool to the boundary exceeds a limit boundary distance required for continued operation. If so, the maximum dead reckoning distance may be set based on the limit boundary distance. Any distance discussed herein, such as the distance from the robotic tool to the boundary, may be a distance in three-dimensional space, or approximated by a projection of the distance in two dimensions, for example onto a two-dimensional map.

According to an embodiment, executing a safety operation comprises stopping the propulsion of the robotic tool. Thereby, the robotic tool may be safely stopped before risking exiting the boundary defining the work area. Alternatively or additionally, executing a safety operation may comprise stopping a work implement of the robotic tool. Thereby, any dangerous parts of the robotic tool may be safely stopped before risking exiting the boundary defining the work area. An exemplary work implement may be a vegetation cutter, such as a rotating grass cutting blade. Alternatively or additionally, executing a safety operation may comprise changing heading of the robotic tool. Thereby, exiting the work area may be avoided. According to embodiments, the heading may be changed by more than 90°, more than 135°, or between 160° and 200°. Upon changing direction, a new maximum dead reckoning navigation distance may be set. The new maximum dead reckoning navigation distance may be set more generously for sharper heading changes. According to an example, the safety operation may be to turn back to the position where it latest obtained a reliable position, i.e. towards the area where the maximum dead reckoning distance was set. Upon passing this area, it can be expected that the robotic tool may once again be able to reliably determine its position. According to an embodiment, determining a positioning status of the robotic tool may comprise receiving a wireless positioning signal. Receiving a wireless positioning signal may comprise receiving a satellite navigation signal such as a GNSS signal, and/or a signal or signals from one or several local beacon(s). According to embodiments, the method may comprise estimating a GNSS positioning error, wherein said maximum dead reckoning navigation distance is set based on the GNSS positioning error. In a particularly accurate embodiment, receiving the positioning signal may comprise receiving an RTK-GNSS (real-time kinematic GNSS) correction signal allowing RTK-GNSS positioning. In such an embodiment, a positioning signal may, by way of example, be considered reliable if a positioning signal is received from at least a first limit number of local base stations and at least a second limit number of satellites. Typically, the first limit number may be at least one, and the second limit number may be at least three, for example four or five. In an RTK-GNSS enabled embodiment, the determination of whether a new positioning status can or cannot be reliably obtained may also be based on the status of the RTK ambiguity resolution ("RTK Fix" or "RTK float") in the manner known in the art.

According to an embodiment, the robotic tool may be configured to automatically change its heading before reaching the maximum dead reckoning distance. By way of example, the robotic tool may be configured to, upon finding that it cannot reliably determine its positioning status, initially continue navigating in the direction of its current heading, within the constraints set by the maximum dead reckoning distance. After having navigated a portion of the maximum dead reckoning distance, the robotic tool may initiate a navigation signal search procedure. The navigation signal search procedure may comprise, for example, estimating a position on a map associated with navigation signal reception data. Based on the estimation, the robotic tool may change its heading to continue towards an area of the map with a higher probability of a good navigation signal reception, still within the constraints of the maximum dead reckoning navigation distance. If no new positioning status of the robotic tool has been reliably obtained upon reaching the maximum dead reckoning navigation distance, the robotic tool will execute the safety operation.

According to an embodiment, determining that a new positioning status of the robotic tool within the area cannot be reliably obtained may comprise reliably receiving a wireless positioning signal; setting a start value of a counter; increasing or decreasing the value of the counter; and if no wireless positioning signal has yet been received when the counter has reached a limit value, determining that a new positioning status of the robotic tool within the area cannot be reliably obtained. The counter may be based on the travelled distance registered by dead reckoning, such that if no reliable positioning signal is received within a limit distance travelled, it is determined that positioning is unreliable. Setting a start value of the counter may comprise setting a maximum dead reckoning navigation distance, and increasing and decreasing the value of the counter may comprise iteratively subtracting from the maximum dead reckoning navigation distance, for each movement of the robotic tool, the travelled distance registered by a dead reckoning device, until the maximum dead reckoning navigation distance has reached a lower limit value. Alternatively, the counter may be, by way of example, a timer, such that if no reliable positioning signal is received within a limit time, it is determined that positioning is unreliable.

According to an embodiment, the boundary distance value may be based on the shortest distance from the determined position to the boundary. Thereby, regardless of how the robot navigates within the area, the robot may stop or turn before the boundary is reached.

According to an embodiment, the boundary may comprise a plurality of boundary segments, each boundary segment associated with a boundary classification, wherein the method comprises identifying a subset of said boundary segments based on boundary classification; and wherein estimating a boundary distance value indicative of a distance from the robotic tool to the boundary comprises estimating a boundary distance value based on the classification of said selected subset. A boundary or boundary segment may be virtual, i.e. it may be a virtual representation of a boundary or boundary segment which does not need a physical representation in the terrain. By way of example, a virtual boundary may be represented by e.g. map data and/or GNSS positions. A virtual boundary may e.g. be defined based on operator input when configuring the robotic tool for its first use within the work area. With regard to classification, virtual boundary portions or segments can, for example, be classified based on terrain features at the boundary as such, and/or based on areas adjacent to the work area, across the boundary. For example, physical obstacles such as walls and fences may physically prevent the robotic tool from crossing, and need not be part of the calculation of a maximum dead reckoning navigation distance. Similarly, areas adjacent to, and not forming part of the work area, may still be ok to transit. For example, in the case of a robotic lawnmower, paved pathways need not be mowed and may be excluded from the area to be mowed, but a robotic lawnmower having lost GNSS connection may still be allowed to enter such an area without posing a safety risk.

According to an embodiment, the positioning status of the robotic tool may further comprise a determined heading of the robotic tool, and the estimation of a boundary distance value may further be based on the determined heading. Thereby, the robotic tool may be permitted to navigate a longer distance based on dead reckoning if it's heading in a direction in which the distance to the boundary is long. In such a situation, the robotic tool may be further configured to, once having lost its position and started navigating based on dead reckoning, detect a change in heading, and based on the change of heading, determine a new maximum dead reckoning navigation distance. For example, if the robotic tool encounters an obstacle and changes its heading based on the encounter, the maximum distance may be set to the shortest distance from the last known position to the boundary. The robotic tool may determine its heading based on sensor input, such as input from a compass and/or a GNSS receiver.

According to an embodiment, the method may further comprise identifying, based on said determined heading, boundary segments within a navigation sector comprising the determined heading, wherein the estimation of a boundary distance value is further based on said identification of boundary segments within the navigation sector. By way of example, the distance value may be indicative of a distance, such as a shortest distance, from the robotic tool to the boundary within the navigation sector. According to an example, the navigation sector may be defined based on an estimated maximum systematic dead reckoning navigation error of the robotic tool.

According to an embodiment, the boundary distance value may be indicative of a distance to the boundary in the direction of the determined heading.

According to an embodiment, continuing navigating the robotic tool based on dead reckoning may comprise triggering, based on sensor input, a heading change; and based on said heading change, changing the maximum dead reckoning navigation distance. Whenever the robotic tool changes its heading, the distance to the boundary changes.

According to an embodiment, estimating a boundary distance value indicative of a distance from the robotic tool to the boundary may comprise estimating a plurality of boundary distance values indicative of a respective plurality of distances from the robotic tool to the boundary. Thereby, different maximum dead reckoning navigation distances may be set for different positioning and/or navigation scenarios. By way of example, one maximum dead reckoning navigation distance may be used for situations where both position and heading are known by the robotic tool, and another may be used for situations where only the position is known.

According to an embodiment, the boundary may be a virtual boundary defined by GNSS coordinates. In such a system, e.g. trees, buildings etc. positioned at a distance from the virtual boundary, and shadowing the GNSS reception, will have reduced, little, or even no impact on the robotic tool's ability to operate within the area.

According to an embodiment, the boundary may be defined by a boundary wire emitting a boundary wire signal. In hybrid systems incorporating both a boundary wire and a GNSS receiver for improved surface covering, navigation may be permitted even if both the boundary wire signal and the GNSS signal are temporarily lost. This may be the case, for example, in situations where the robotic tool is far from the boundary, i.e. in a central location of the work area, where the boundary wire signal is weak. In such an arrangement, an installation's maximum permitted distance to the boundary wire may be increased, since no boundary wire signal is needed near the centre of the work area, where the maximum dead reckoning navigation distance may be generously set.

According to a second aspect, there is provided a method of navigating a self-propelled robotic tool within a work area defined by a virtual boundary, the virtual boundary comprising a plurality of boundary segments, each boundary segment associated with a boundary classification, the method comprising determining that the robotic tool is approaching a boundary segment; determining a boundary classification of the boundary segment; and navigating the robotic tool relative to the boundary based on the determined classification of the boundary segment. The virtual boundary may be represented by e.g. map data and/or GNSS positions. Typical boundary classifications may be, for example, hard virtual boundaries that the robot is not allowed to cross, soft virtual boundaries that the robot is allowed to cross, and soft virtual boundaries associated with physical obstacles, which soft virtual boundaries the robotic tool is allowed, but unable, to cross. Navigating the robotic tool relative to the boundary may comprise, for example, stopping the robotic tool from crossing the boundary, allowing the robotic tool to freely cross the boundary, or allowing the robotic tool to cross the boundary with a constraint imposed, such as allowing the robotic tool to cross the boundary by a maximum dead reckoning navigation distance, and/or allowing the robotic tool to cross the boundary once it has disabled a work implement of the robotic tool.

According to a third aspect, there is provided a method of defining a work area for a self-propelled robotic tool, the method comprising receiving input representing a virtual boundary, the virtual boundary comprising a plurality of boundary segments; for at least a subset of the boundary segments, receiving input representing a boundary classification; and for each boundary segment of said at least a subset, storing the boundary classification associated with the respective boundary segment.

According to a fourth aspect, there is provided a method of navigating a robotic tool within a work area defined by a boundary wire, the method comprising determining that a signal from the boundary wire cannot be reliably received; determining a GNSS position; estimating a GNSS positioning error; based on the GNSS position and the GNSS positioning error, determining a distance value representing a distance to the boundary wire; setting a maximum navigation distance based on the boundary distance value; continuing navigating the robotic tool; and if no signal from the boundary wire has been reliably received upon reaching the maximum navigation distance, executing a safety operation based on having reached the maximum navigation distance. The method may enable a robotic tool to keep operating even in the absence of a boundary wire signal, since the robotic tool may nevertheless be safely stopped or turned before or upon reaching the boundary wire.

According to a fifth aspect, there is provided a method of navigating a robotic tool within a work area defined by a boundary wire, the method comprising: based on GNSS signal reception, determining a GNSS position; based on GNSS signal reception, estimating a GNSS positioning error; determining that a signal from the boundary wire cannot be reliably received; based on the GNSS position and the GNSS positioning error, determining whether a distance to the boundary wire at least exceeds a limit distance; and if the distance to the boundary wire exceeds said limit distance, continuing navigating the robotic tool; else, executing a safety operation. Also this method may enable a robotic tool to keep operating even in the absence of a boundary wire signal, since the robotic tool may nevertheless be e.g. safely stopped or turned before or upon reaching the boundary wire. The position of the boundary wire may be represented by a virtual boundary, e.g. as a set of GNSS positions, such that the robotic tool can determine its position in relation to the boundary wire without receiving a boundary wire signal. The limit distance may be set to a positive value, such that a certain minimum distance to the boundary is required for continuing navigation. Alternatively, the limit distance may be zero or negative, to allow the robotic tool to cross the boundary wire to some extent. Present safety standards permit slightly crossing the boundary wire. Similar to what has been suggested hereinabove, mutatis mutandis, the distance used for determining whether a distance to the boundary wire at least exceeds a limit distance may be, for example, the shortest distance from the robotic tool to the boundary wire, the shortest distance from the robotic tool to a subset of boundary wire segments based on boundary wire segment classification, or the distance from the robotic tool to the boundary wire in the robotic tool's present heading. The safety operation may comprise stopping or turning the robotic tool, and/or stopping a work implement of the robotic tool.

According to embodiments, the boundary may be a virtual boundary representing the position of the boundary wire.

According to a sixth aspect, there is provided a self-propelled robotic tool comprising a positioning device configured to determine a position of the robotic tool within a work area; a dead reckoning device configured to generate a movement signal indicative of a movement of the robotic tool relative to a known starting position; and a controller configured to operate the robotic tool in accordance with any of the methods defined herein.

According to an embodiment, the positioning device may comprise a satellite navigation receiver such as a GNSS receiver.

According to an embodiment, the robotic tool is an outdoor robotic tool such as a robotic garden tool, for example a robotic lawnmower. According to other embodiments, the robotic tool may be a farming equipment, a vacuum cleaner, a floor cleaner, a street sweeper, a snow removal tool, a golf ball retriever robot, a cleaner robot, a leaves blower robot, a leaves collector robot, snow thrower robot or a mine clearance robot.

According to a seventh aspect, there is provided a computer program comprising instructions which, when the program is executed by a processor, cause the processor to carry out any of the methods defined herein.

According to an eighth aspect, there is provided a computer-readable medium comprising instructions which, when executed by a processor, cause the processor to carry out any of the methods defined herein.

It is noted that embodiments of each aspect of the invention may be embodied by all possible combinations of features mentioned with reference to the other aspects. In particular, it will be appreciated that the various embodiments described for the robotic tool are combinable with the methods as defined above.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawings, where the same reference numerals will be used for similar elements, wherein.

All the figures are schematic, not necessarily to scale, and generally only show parts which are necessary in order to elucidate the embodiments, wherein other parts may be omitted.

DETAILED DESCRIPTION OF THE EXEMPLARY EMBODIMENTS

Figure 1:
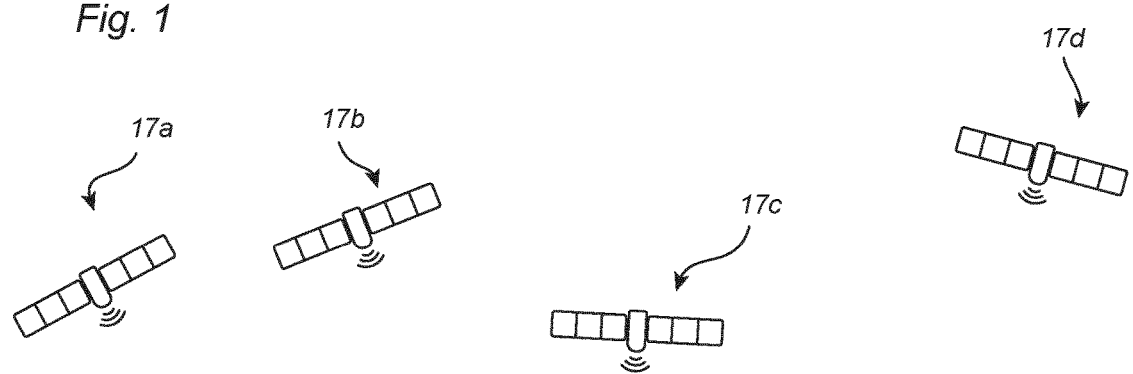
FIG. 1 is a diagrammatic view in perspective of a robotic lawnmower system comprising a base station and a robotic lawnmower.
Figure 1:
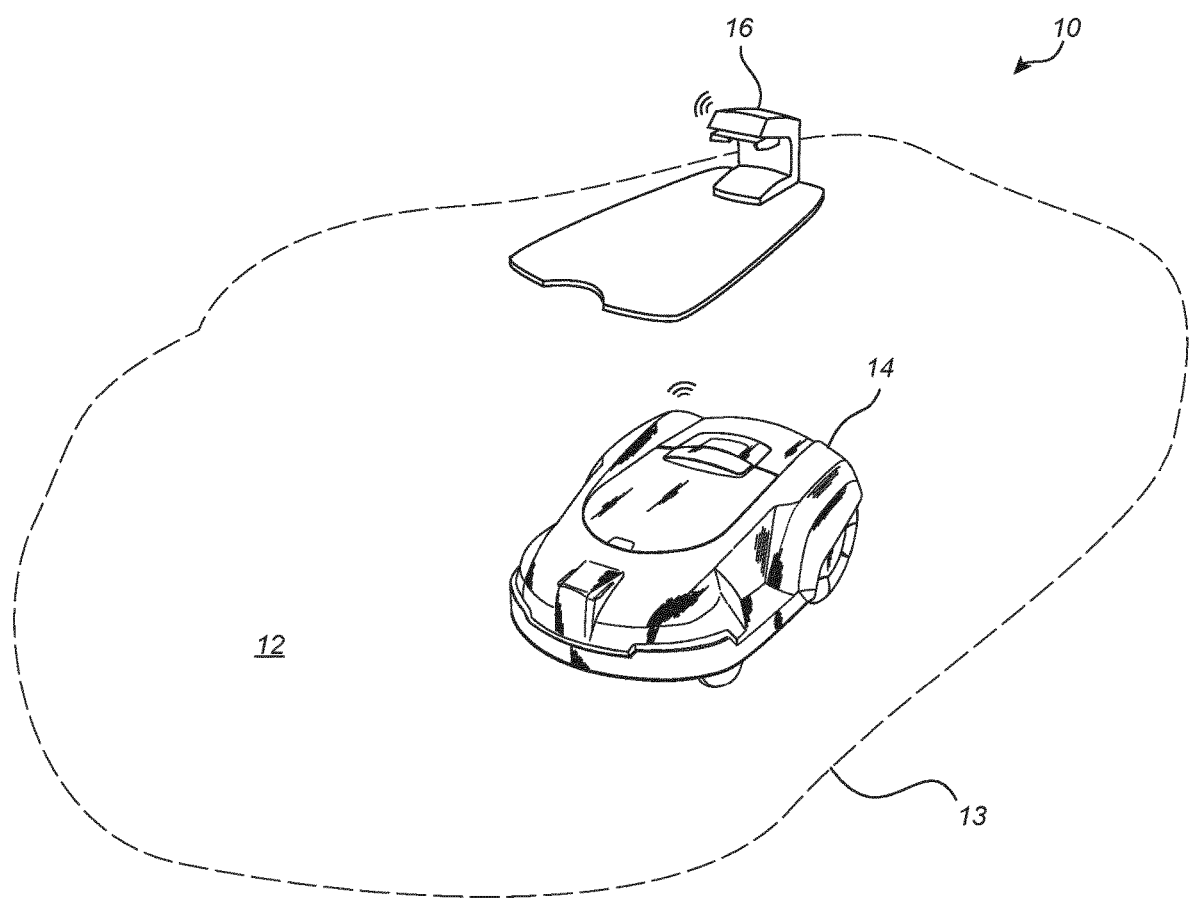

FIG. 1 schematically illustrates an overview of an area treatment system 10 configured to perform a task within a work area 12 such as a garden, a parcel, a crop field, or a floor area. The area treatment system 10 comprises a self-propelled robotic tool 14 and a base station 16, which may be stationary. The work area 12 is defined by a perimeter or boundary 13, outside which the robotic tool 14 is not allowed to operate. As primarily described herein, the robotic tool 14 may be a robotic lawnmower. However, the present disclosure may also be useful in connection with robotic tools configured as golf ball collecting tools, vacuum cleaners, floor cleaners, street sweepers, snow removal tools, mine clearance robots or any other type of robotic tool that is required to operate over a work area in a methodical and systematic or position-oriented manner. In particular, the teachings herein may be of particular use in robotic tools configured to execute a task over an area to be treated, wherein a full or at least predetermined coverage of the area to be treated is desired. Each of the robotic tool 14 and the base station 16 receives wireless positioning signals from a plurality of navigation satellites 17a, 17b, 17c, 17d. Moreover, the base station 16, which is immobile, wirelessly transmits, based on the received positioning signals, a positioning correction signal to the robotic tool 14 for real-time kinematics, RTK, positioning.

Figure 2:
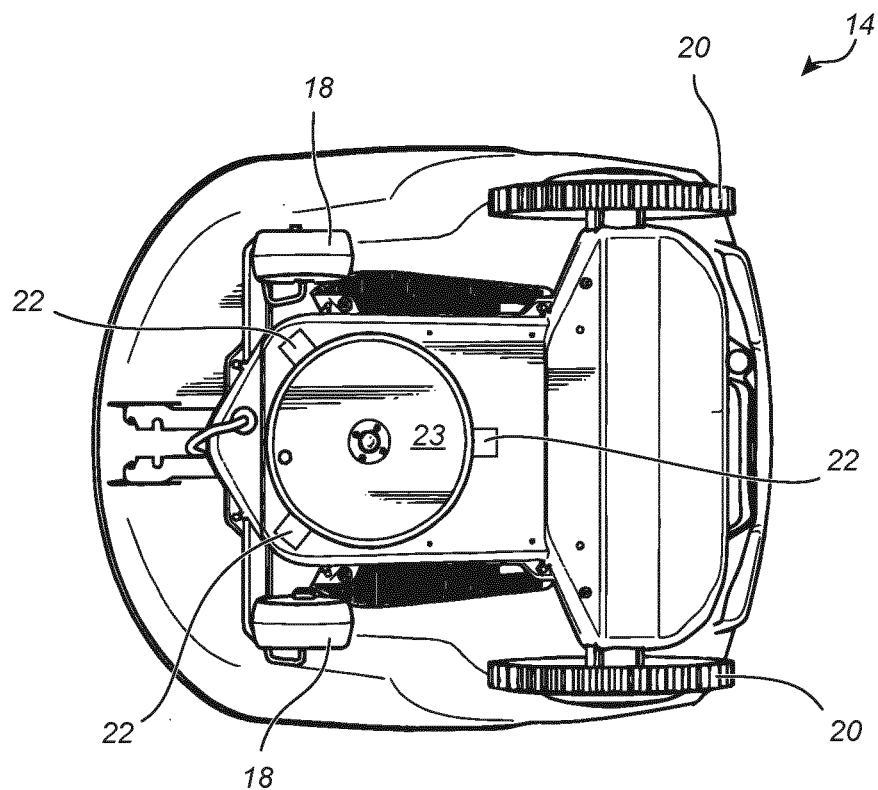
FIG. 2 is a bottom view of the robotic lawnmower of FIG. 1.

FIG. 2 illustrates the self-propelled robotic tool 14 as seen from below. The robotic tool is provided with wheels 18, 20 for moving within the work area 12 to be treated. In the example of FIG. 2, the robotic tool 10 has two front wheels 18, which are of swivel type, and two rear wheels 20. Typically, at least one of the wheels 18, 20 is connected to a motor, such an electric motor, either directly or via a transmission (not illustrated). The robotic tool 14 also comprises at least one tool element configured to perform the task on the area to be treated. The tool element may be a grass cutting device, such as a plurality of cutting blades 22, which may be connected to a cutting disc 23 rotatable about a vertical axis.

Figure 3:
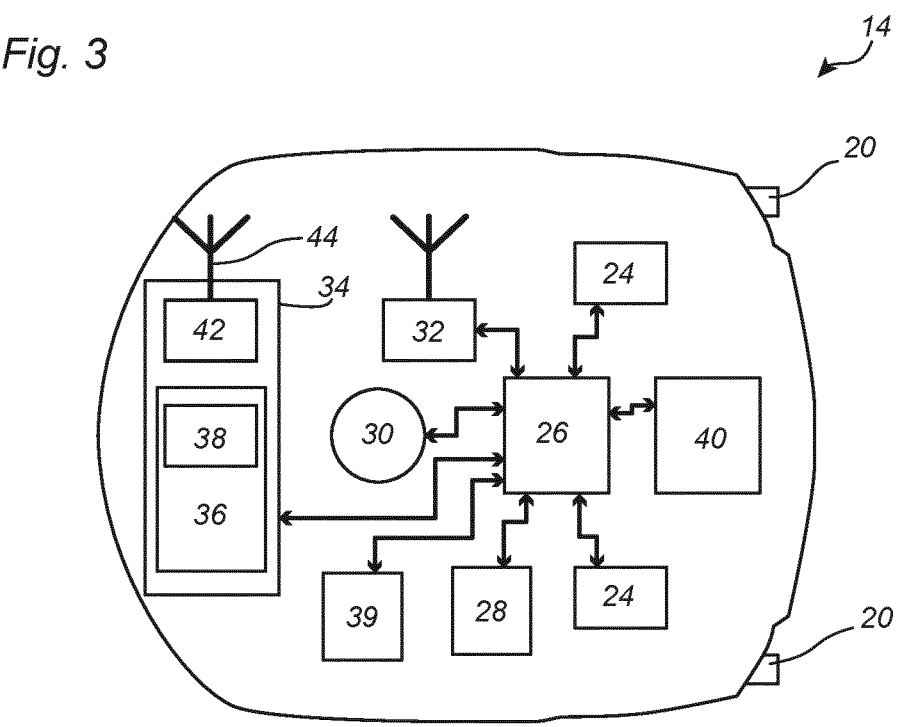
FIG. 3 is a schematic illustration of the functional blocks of the robotic lawnmower of FIGS. 1-2.

FIG. 3 illustrates functional blocks of the robotic tool 14. In the example of FIG. 3, each of the rear wheels 20 is connected to a respective electric propulsion motor 24. This allows for driving the rear wheels 20 independently of one another, enabling e.g. steep turning of the robotic tool 14. The robotic tool 14 further comprises a controller 26. The controller 26 may be connected to sensors, actuators, and communication interfaces of various kinds, and may be implemented using a central processing device executing instructions stored on a memory 28. Needless to say, different combinations of general and application-specific integrated circuits may be used as well as different memory technologies. The controller 26 should be regarded as a functional block, i.e. it may consist of one single electronics unit, or may be distributed across several units which communicate with each other. In general, the controller 26 is configured to read instructions from the memory 28 and execute these instructions possibly in view of different sensor signals to control the operation of the robotic tool 14. Typically, the controller 26 is configured to, based on the instructions, control the robotic tool in an autonomous or semi-autonomous manner, i.e. with no, or only occasional, instructions from a human operator. The controller 26 also controls the operation of a cutter motor 30, which is configured to drive the cutting blades 22 (FIG. 2).

A wireless transceiver 32 is connected to the controller 26, and allows the controller 26 to wirelessly communicate with the base station 16 or any other device, such as a remote control or a smart phone (not shown), via e.g. any established wireless networking standards.

The robotic tool 14 further comprises a navigation system 34. In the illustrated example, the navigation system 34 comprises a dead reckoning device 36, which comprises one or several inertial navigation sensors 38 such as an accelerometer and/or a gyroscope. The dead reckoning device 36 allows the robotic tool 14 to keep track of its movement within the area 12 to be treated. The navigation system 34 may also comprise a compass (not shown), to provide basic orientation information that may compensate for any drift of the inertial navigation sensors.

The controller 26 also controls the propulsion motors 24, thereby controlling the propulsion of the robotic tool 14 within the area 12 to be treated. The propulsion motors 24 may be stepper motors, allowing the controller 26 to keep track of the respective number of turns of the motors 24, and thereby also the distance travelled by the robotic tool 14, as well as any turning angle of the robotic tool 14 when the motors 24 are operated at different speeds or in reverse directions. In this respect, the propulsion motors 24 may themselves operate as odometers. Alternatively, the wheels 20 may be provided with odometer indexers configured to provide feedback to the controller 26 about the number of turns of each motor 24. Navigation information from the odometers 24 is fused with navigation information from the inertial navigation sensors 38 in the dead reckoning device 36, to provide dead reckoning navigation information in relation to a known starting point.

The robotic tool may also comprise a magnetic field sensor 39 configured to detect a magnetic field emitted by a boundary wire (not shown) defining the perimeter of the work area 12. A boundary wire may be used for defining the boundaries of the area 12 to be treated, or to otherwise provide a reference to assist the robotic tool 14 to navigate.

The controller 26, navigation system 34, transceiver 32, and electric motors 24, 30 are powered by a battery 40. The robotic tool 14 is configured to navigate to the base station 16 on a regular basis, and/or whenever the battery charge is running low, in order to dock with the base station 16 for recharging the battery 40. The base station 16 may be connected so as to receive power from the electric power grid.

The navigation system 34 further comprises a positioning device 42 configured as a GNSS signal receiver connected to a GNSS antenna 44. The positioning device 42 is configured to receive a GNSS positioning signal from the navigation satellites 17a-d (FIG. 1), and to receive an RTK correction signal from the base station 16. Based on the received signals, the positioning device 42 determines the robotic tool's position in relation to the boundary 13 (FIG. 1), e.g. based on a stored map representing the work area 12. The navigation system 34 and the dead reckoning and positioning devices 36, 42 should be regarded as functional blocks rather than physical units. As such, each of the dead reckoning and positioning devices 36, 42 may be distributed across several separate physical electronics units. Alternatively, they may both be implemented in a single electronics unit, which may be the same as, or separate from, the controller 26. Their functionalities may be implemented by hardware, firmware, and/or software in any suitable combination; by way of example, their functions may be partly realized as software within the controller 26.

Figure 4A:
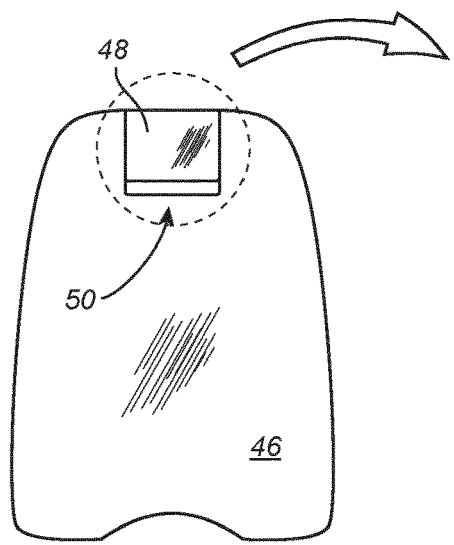
FIG. 4a is a diagrammatic top view of the base station of FIG. 1.
Figure 4B:
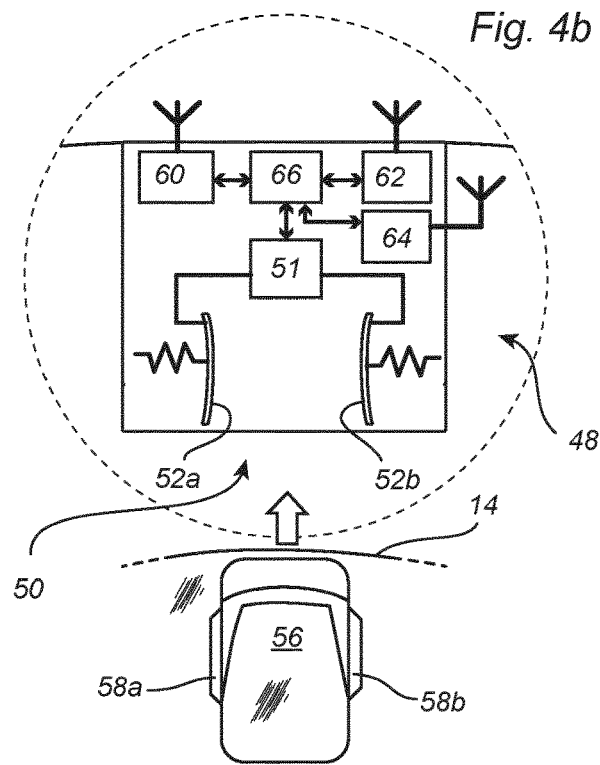
FIG. 4b is a magnified view of a portion of the base station of FIG. 4a, illustrating functional blocks of the base station, together with a portion of the robotic lawnmower of FIGS. 1-3.

Turning now to FIG. 4a, the base station 16 comprises a parking base plate 46 and an electronics unit 48 provided with a base station docking interface 50. The functional blocks of the electronics unit 48 are illustrated in greater detail in the magnified view of FIG. 4b. The base station docking interface 50 comprises a charger 51 provided with a pair of charging connectors 52a-b facing each other. A mating robotic tool docking interface 56 is provided with a pair of charging connectors 58a-b facing away from each other. The robotic tool docking interface 56 is configured to enter the base station docking interface 50, electrically connecting each charging connector 58a-b of the robotic tool 14 with a respective charging connector 52a-b of the base station 16, as the robotic tool 14 moves into its docking position along a docking line illustrated by an arrow. A GNSS signal receiver 60 is configured to receive a GNSS positioning signal from the satellites 17a-d (FIG. 1), and a correction signal transmitter 62 is configured to transmit an RTK correction signal to the robotic tool 14. A wireless data transceiver 64 allows the base station 16 to share data with the robotic tool 14. The wireless interfaces 60, 62, 64 are connected to a processor 66, which generates the wireless correction signal based on the GNSS signals received from the satellites 17a-d.

Figure 5:
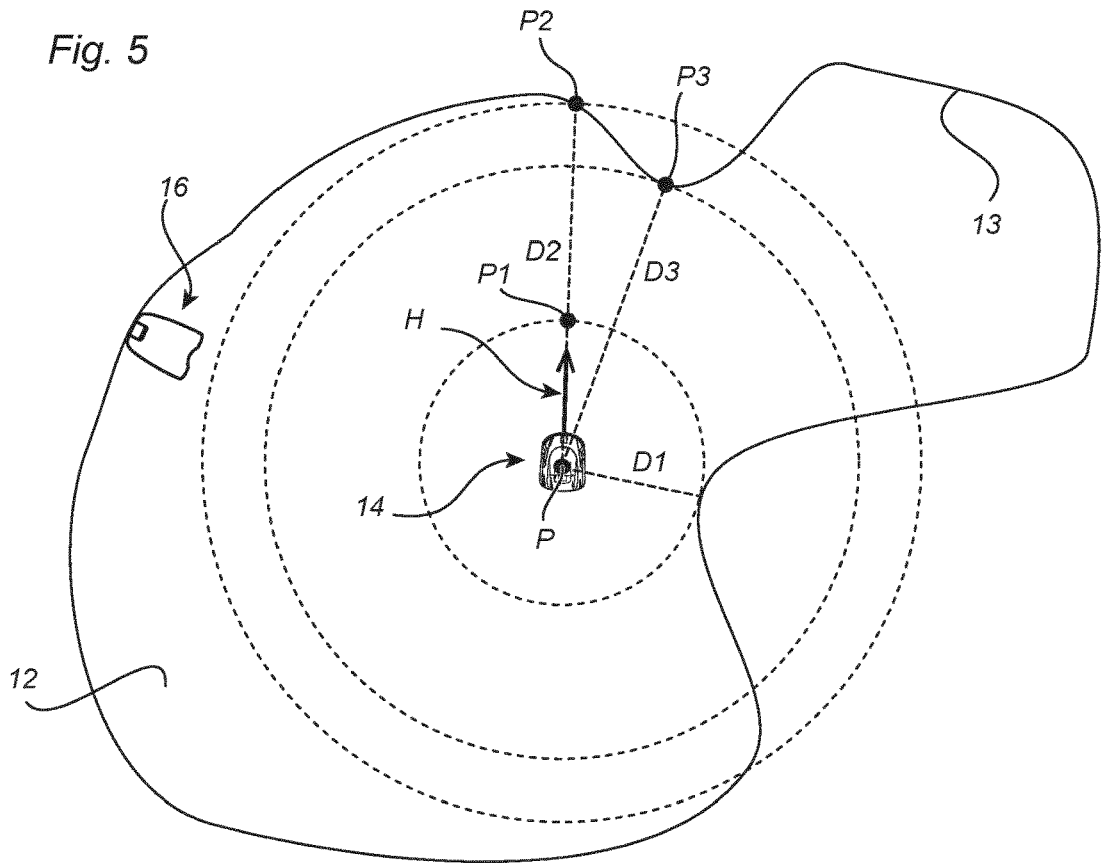
FIG. 5 is a schematic top view of a work area, and illustrates a first navigation scenario of the robotic lawnmower.

FIG. 5 illustrates an exemplary navigation scenario of the robotic tool 14 within a work area 12 defined by a boundary 13. While the robotic tool 14 navigates within the work area 12, the positioning device 42 (FIG. 3) continuously keeps track of the positioning status, including the current position P and current heading H, of the robotic tool 14. The positioning status is shared with the controller 26, and forms the basis for the controller 26 to navigate the robotic tool, i.e. for generating steering and control signals to the drive wheels 20 to propel the robotic tool 14 in a desired direction. Moreover, the dead reckoning device 36 continuously keeps track of the distance travelled by the robotic tool 14 since the last time an updated position was received.

While the positioning device 42 continuously or regularly updates the robotic tool's 14 determined position while navigating, the controller 26 also continuously or regularly sets a maximum dead reckoning navigation distance. Each time an update of the robotic tool's position is reliably received by the positioning device 42, the maximum dead reckoning distance is set based on a boundary distance value, which is determined based on the robotic tool's 14 position relative to the boundary 13, and which represents a distance from the robotic tool 14 to the boundary 13.

In some situations, the positioning device 42 may become unable to determine the present position P. This may be the case, for example, when GNSS reception is shadowed by a tree, such that the positioning signals of an insufficient number of navigation satellites 17a-d can be received. This may pose a problem because, if the robotic tool 14 is unable to determine that it is within the work area, present safety standards require it to stop. However, thanks to having determined a maximum dead reckoning navigation distance, the robotic tool 14 may be allowed to continue operating until it has reached the maximum dead reckoning navigation distance.

Figure 6:
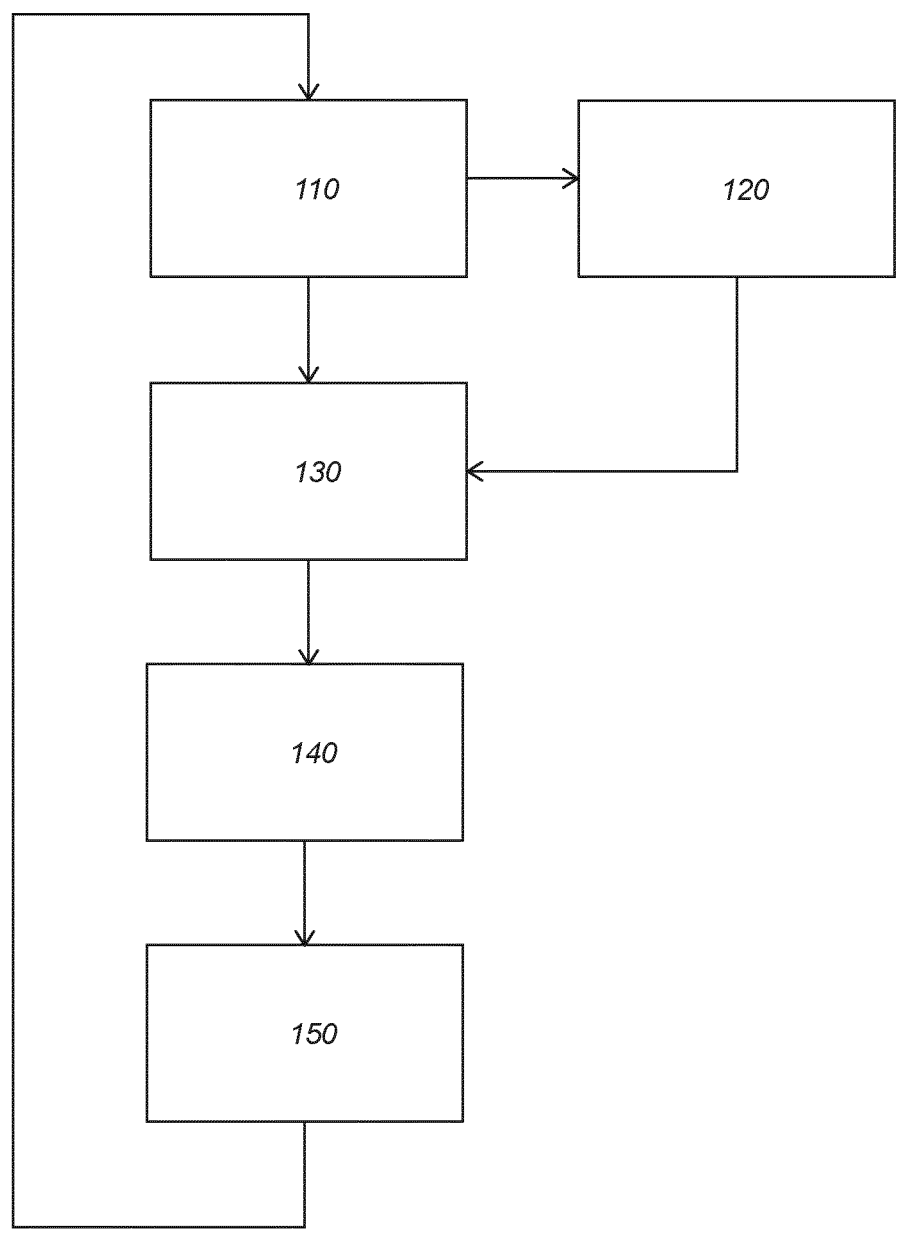
FIG. 6 is a flow chart illustrating a navigation method of the robotic lawnmower in the navigation scenario of FIG. 5.

The navigation method is illustrated in the flow chart of FIG. 6:

In step 110, the positioning device 42 (FIG. 3) attempts to determine the position P (FIG. 5) of the robotic tool 14.

If the positioning device 42 was able to determine the position P, the controller 26 determines, in step 120, a boundary distance value based on the position P, and sets a maximum dead reckoning navigation distance based on the determined boundary distance value.

In step 130, if the maximum dead reckoning distance has not been set or is below a lower limit distance, the controller 26 executes a safety operation, which may or may not involve stopping the operation of the robotic tool 14, as will be described further below.

If the robotic tool 14 is allowed to continue operating, in step 140, the robotic tool 14 propels itself a distance increment across the work area, while the dead reckoning device 36 records the distance increment travelled.

In step 150, the controller subtracts the recorded distance increment from the maximum dead reckoning navigation distance, to obtain a new, updated, maximum dead reckoning navigation distance.

The method then repeats from the start.

Returning to FIG. 5, there are several different alternatives for determining the distance value, and for executing the safety operation. In the simplest case, the robotic tool 14 may estimate a boundary distance value representing the shortest distance D1 from its present position P to the boundary, and determine a maximum dead reckoning navigation distance based on the distance D1. In particular, the robotic tool 14 may set the maximum dead reckoning navigation distance to said shortest distance D1. In such a scenario, the robotic tool 14 would execute a safety operation once it reaches point P1, situated at the intersection between the robotic tool's 14 present heading H and the circle defined by the maximum dead reckoning navigation distance D1. In an alternative embodiment, the robotic tool 14 may set the maximum dead reckoning navigation distance to another value based on the shortest distance D1, for example the distance D1 minus a safety margin, or a percentage, such as 90%, of the distance D1. Once reaching the maximum dead reckoning navigation distance at P1, the safety operation may be to stop the robotic tool 14, or to perform any other safety operation as suggested herein.

In an alternative embodiment, the robotic tool 14 may estimate a boundary distance value representing the distance D2 from its present position P to the boundary, as seen in the present heading direction H of the robotic tool 14, and determine the maximum dead reckoning navigation distance based on the distance D2. By way of example, the robotic tool 14 may set the maximum dead reckoning navigation distance to said distance D2. In such a scenario, the robotic tool 14 would execute a safety operation once it reaches point P2, situated at the intersection between the robotic tool's 14 present heading H and the circle defined by the maximum dead reckoning navigation distance D2. Once reaching the maximum dead reckoning navigation distance at P2, the safety operation may e.g. be to turn the robotic tool 14 left by 90° such that it remains within the work area 12, or to turn very sharply, such as by between 160° and 200°, such that it bounces against the virtual boundary 13 and moves back towards the centre of the work area 12. After turning, the robotic tool 14 may set a new maximum dead reckoning navigation distance based on a new estimated distance to the boundary 13. The controller 26 may be configured to select the safety operation, such as the turning direction and/or turning angle, based on a stored map representing the shape of the boundary 13. If turning by 180° at point P2, and assuming that there have been no substantial errors introduced in the dead reckoning navigation, the maximum dead reckoning navigation distance can be safely set to at least D2+D1.

In the event that the robotic tool 14 encounters an obstacle along its way from the point P towards the point P2, such that the robotic tool 14 is triggered to change its heading direction H, the controller 26 may change the maximum dead reckoning navigation distance accordingly. For example, it may instead base its maximum dead reckoning navigation distance based the shortest distance D1 as a fall-back. In fact, the controller 26 may, at each position P, estimate several different boundary distance values, such as the shortest distance D1 and the distance D2 in the heading direction H. The controller 26 may also, based on the plurality of boundary distance values, keep track of several different instances of a maximum dead reckoning navigation distance, wherein the different instances are continuously updated based on input from the dead reckoning device 36. The different instances may be used for different navigation scenarios; for example, one instance of the maximum dead reckoning navigation distance may be used if, or for as long as, the heading H is known, and another instance of the maximum dead reckoning navigation distance may be used if the heading H is unknown or lost.

Figure 7:
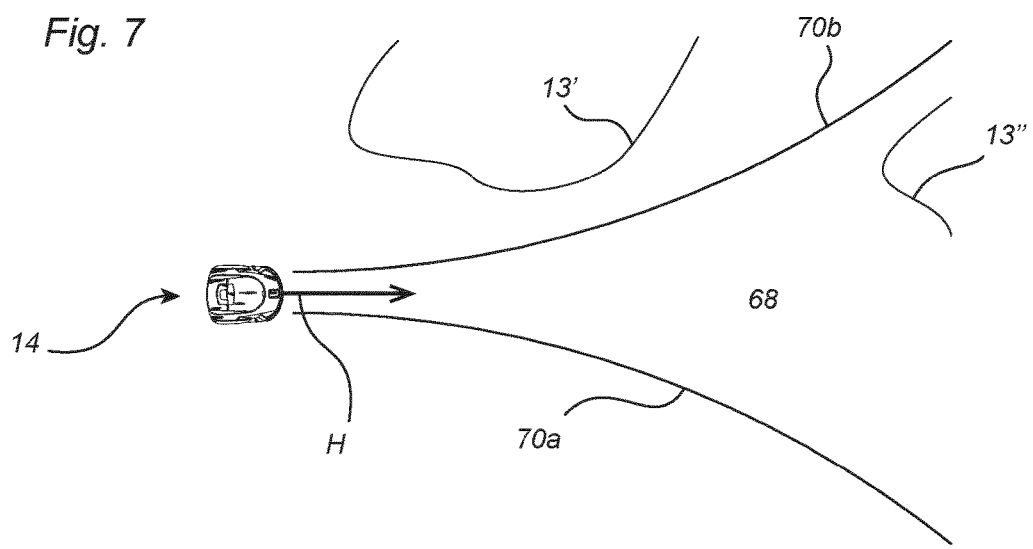
FIG. 7 is a schematic top view of a robotic tool and illustrates a maximum dead reckoning navigation error sector.

In yet an alternative embodiment, the robotic tool 14 may determine the maximum dead reckoning navigation distance based on the distance D3 from its present position P to the boundary, as seen in the present heading direction H of the robotic tool 14 plus a dead reckoning navigation error. Such a situation is illustrated in greater detail in FIG. 7. In the situation of FIG. 7, the robotic tool 14 determines a dead reckoning navigation sector 68 based on its current heading H. The dead reckoning navigation sector 68 is delimited by a pair of worst-case systematic error trajectories 70a, 70b, which are determined based on a worst-case systematic dead reckoning navigation error. Such a systematic dead reckoning navigation error could result from e.g. incorrect navigation information from the odometers 24 (FIG. 3), due to e.g. uneven grass build-up on the drive wheels 20, and/or due to any slope of the work area. Some segments 13' of the boundary will be located outside the dead reckoning navigation sector 68, whereas other segments 13" will be located within the sector 68. Based on the dead reckoning navigation sector 68, any boundary segments 13" within the sector 68 are identified, and a boundary distance value is determined based only on the boundary segments 13" within the sector 68. Based on the boundary distance value thus obtained, a maximum dead reckoning navigation distance is set. By way of example, the robotic tool 14 may set the maximum dead reckoning navigation distance based on the shortest distance from its present position to any boundary segments 13" within the navigation sector 68. Boundary segments 13' outside the sector 68 need not be taken into account when determining the maximum dead reckoning navigation distance, since the dead reckoning navigation error of the robotic tool will be sufficiently small to keep the robotic tool 14 within the sector 68. As has been explained with reference to FIGS. 5 and 6, the robotic tool 14 may determine several different boundary distance values, reflecting boundary distances in several different directions. The boundary distance value(s), upon which to base the setting of a maximum dead reckoning distance, may be selected based on to which extent the present heading H is known.

Figure 8:
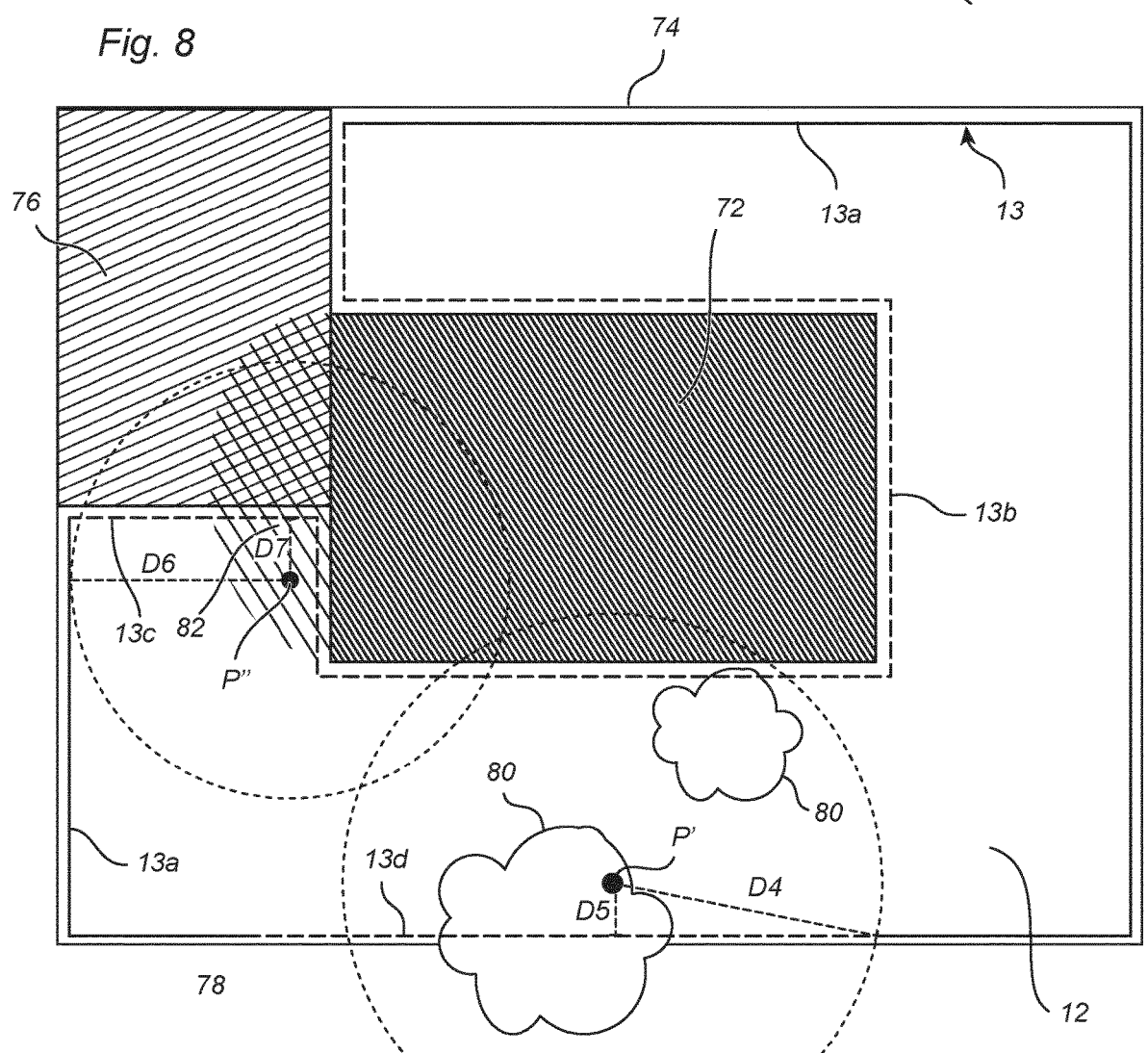
FIG. 8 is a schematic top view of a work area, and illustrates a second navigation scenario of the robotic lawnmower.

FIG. 8 illustrates a building 72 located on a plot 74. The plot comprises a driveway 76, and a lawn 12 which is the work area of a robotic tool 14 (FIG. 1) such as a robotic lawnmower. The plot 74 is next to a piece of land that's not being used; hence, on one side of the plot 74, there is an uncut rough 78. Trees 80 intermittently shadow GNSS signal reception in certain areas, and the building 72 intermittently shadows GNSS signal reception in another shadowed area 82 (hatched), making GNSS reception unreliable.

The work area boundary 13 is a virtual boundary defined by GNSS coordinates only, and comprises a plurality of boundary segments 13a, 13b, 13c, 13d. Each boundary segment is associated with a boundary classification which, together with other map data, is stored in the memory 28 (FIG. 3). The user may be allowed or prompted to set the boundary classifications for different segments 13a-d via a user interface, for example when defining the work area boundary 13 during installation of the robotic tool system 10.

Some boundary segments 13a, which are illustrated by solid lines in FIG. 8, are classified as hard, i.e. the robotic tool 14 is, for safety reasons, under no circumstances allowed to cross them. Other boundary segments 13b, 13c, 13d, which are illustrated by dashed lines in FIG. 8, are classified as soft, i.e. the robotic tool 14 may be allowed to cross them in certain situations, even though any areas accessed by crossing the soft boundaries 13b-d do not form part of the work area 12. Some of the soft boundary segments 13b are classified as soft because even if the robotic tool 14 attempts to cross the boundary segment 13b, the path will be blocked by physical obstacles, such as the wall of the building 72. Other boundary segments 13c-d are classified as soft because if the robotic tool 14 crosses the boundary segment 13b-c, the area 76, 78 thereby accessed is safe to transit, though no work needs to be done there. The robot may retain, as part of the classification information in the memory 28, information on whether the respective soft boundary segment 13b-d is associated with a physical obstacle or not. As only the work area 12 needs mowing, the robotic tool 14 may be configured to refrain from unnecessary crossing of the soft boundary segments 13b-d whenever GNSS positioning is reliable.

FIG. 8 illustrates the robotic tool 14 at two different positions P' and P", in each of which the robotic tool 14 is unable to determine its positioning status. In position P', the robotic tool 14 may be configured to estimate a boundary distance value representing the shortest distance D4 from its present position P' to the nearest hard boundary segment 13a. Based on the distance value, the robotic tool 14 determines the maximum dead reckoning navigation distance. By way of example, the robotic tool 14 may set the maximum dead reckoning navigation distance to said distance D4. In such a scenario, the robotic tool 14 would execute a safety operation, such as turning around, once it reaches any point on the dashed circle of radius D4. In some occasions, depending on the present heading when the robotic tool 14 loses GNSS reception, the robotic tool will not turn around until it has penetrated a certain distance into the rough 78, or until it has collided with and/or bounced against the wall of the building 72. The robotic tool 14 may also be configured to disable the cutting motor 30 (FIG. 3) once it has propelled itself the distance D5, corresponding to the shortest distance from point P' to the nearest soft boundary segment 13d, in order to avoid cutting in the rough. Alternatively, it may be determined that cutting the rough is allowed. For the purpose, each boundary segment may also be associated with additional information, such as information indicating an area type of the area 72, 76, 78 across the soft boundary segment 13b-d, and/or information indicating whether the work implement 22 (FIG. 2) should to continue to operate after crossing the respective soft boundary 13b-d. Obviously, as soon as the robotic tool 14 again receives a reliable position, it may set a new maximum dead reckoning navigation distance and resume normal operation/navigation. If it finds itself to be outside the work area once receiving a reliable position again, the robotic tool 14 may be configured to re-enter the work area, for example by crossing the nearest soft boundary segment 13c, 13d which is not associated with a physical obstacle.

In position P''', the robotic tool 14 may be configured to estimate a boundary distance value representing the shortest distance D6 from its present position P''' to the nearest hard boundary segment 13a. Based on the distance value, the robotic tool 14 determines the maximum dead reckoning navigation distance. By way of example, the robotic tool 14 may set the maximum dead reckoning navigation distance to said distance D6. In such a scenario, the robotic tool 14 would execute a safety operation, such as stopping or turning, if it reaches any point on the dashed circle of radius D6 before regaining GNSS reception. Again, in some occasions, depending on the present heading when the robotic tool 14 loses GNSS reception, the robotic tool will not turn around until it has penetrated a certain distance into the driveway 76, or until it has collided with and/or bounced against the wall of the building 72. Again, the robotic tool 14 may be configured to disable the cutting motor 30 (FIG. 3) once it has propelled itself a certain distance D7. The distance D7 may, for example, be determined based on the shortest distance from point P''' to the nearest soft boundary segment 13c which is not associated with a physical obstacle, in order to ascertain that the cutting motor 30 will be disabled when on the driveway 76, which clearly does not need mowing.

Figure 9:
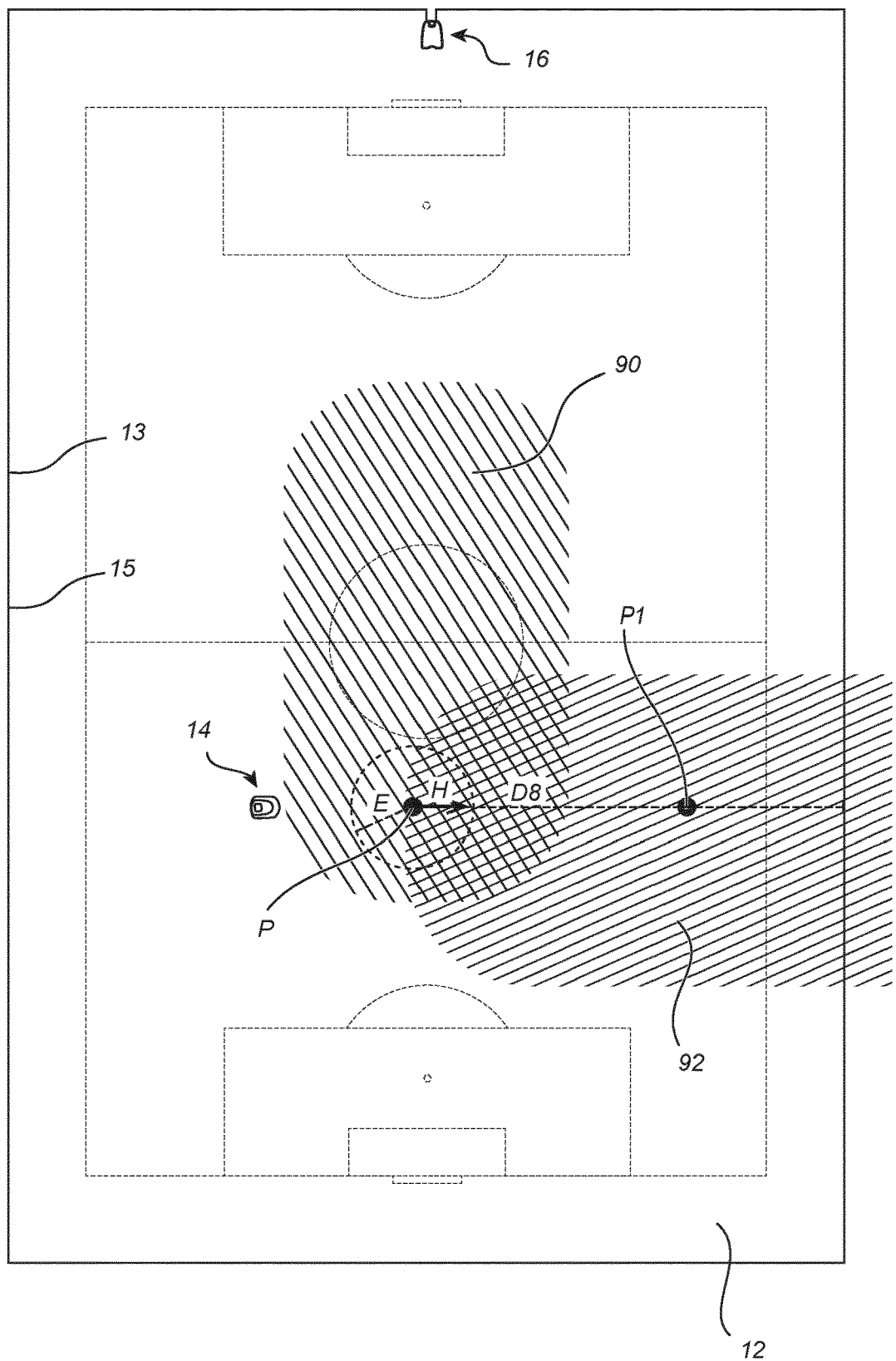
FIG. 9 is a schematic top view of a work area, and illustrates a third navigation scenario of the robotic lawnmower.

FIG. 9 illustrates a robotic tool 14, such as a robotic lawnmower, navigating by GNSS positioning in a large work area 12 delimited by a boundary wire 15. The position of the boundary wire 15 is also represented as a virtual boundary 13 in a map stored in the memory 28 (FIG. 3) of the robotic tool 14; hence, the physical boundary 15 is also reflected by, and in the illustrated embodiment coincides with, a virtual boundary 13. In order to obtain an efficient surface coverage of a large work area, such as a football field (illustrated) or a golf course (not illustrated), the robotic tool 14 navigates systematically or semi-systematically, e.g. by moving across the work area 12 in parallel strokes, or by dividing the work area 12 into sub-areas each of which is navigated in a random manner, in any of the manners known in the art. GNSS positioning is used for enabling a systematic or semi-systematic movement pattern. For safety reasons, the robotic tool 14 is not allowed to cross the boundary wire 15, which provides a very accurate and precise safety boundary, whereas non RTK-enabled GNSS positioning is sometimes too inaccurate for allowing the boundary to be determined by GNSS positions alone. For the purpose, the robotic tool 14 has a boundary wire detector 39 (FIG. 3) allowing the robotic tool 14 to sense the boundary wire 15, and to initiate a turn each time it reaches the boundary wire 15, or stop operation if it finds itself to be outside the loop defined by the boundary wire 15.

In a central area 90 within the work area, far from the boundary wire 15, the boundary wire signal is too weak for the robotic tool 14 to detect. However, a positioning status may be reliably determined via GNSS positioning. By determining that the robotic tool 14 is sufficiently remote from the boundary wire 15, the robotic tool 14 may be allowed to continue operating within the central area 90. However, in some instances, GNSS reception may be intermittent or unreliable, for example in a GNSS shadow area 92, such that no GNSS signal may be reliably obtained.

When the robotic tool 14 enters the GNSS shadow area 92 at point P, the robotic tool 14 may estimate a boundary distance value representing the distance D8 from its present position P to the boundary wire 15/boundary 13, as seen in the present heading direction H of the robotic tool 14, and determine the maximum dead reckoning navigation distance based on the distance D8. By way of example, the robotic tool 14 may set the maximum dead reckoning navigation distance to said distance D8, minus a safety margin determined based on an estimated maximum GNSS positioning error E and an estimated maximum dead reckoning error. In such a scenario, the robotic tool 14 would execute a safety operation if it has still not detected the boundary wire signal once it reaches point P1 at the maximum dead reckoning navigation distance.

In all embodiments described herein, a safety margin may be subtracted from the distance the robotic tool is allowed to travel with insufficient navigation information, such as the maximum dead reckoning navigation distance described with reference to FIGS. 5-8. The safety margin may be set based on many different potential error sources, such as e.g. the speed of the robotic tool 14, the slope of the work area, any grass build-up on wheels, surface properties of the work area 12 such as grass length and moist, etc.

Figure 10:
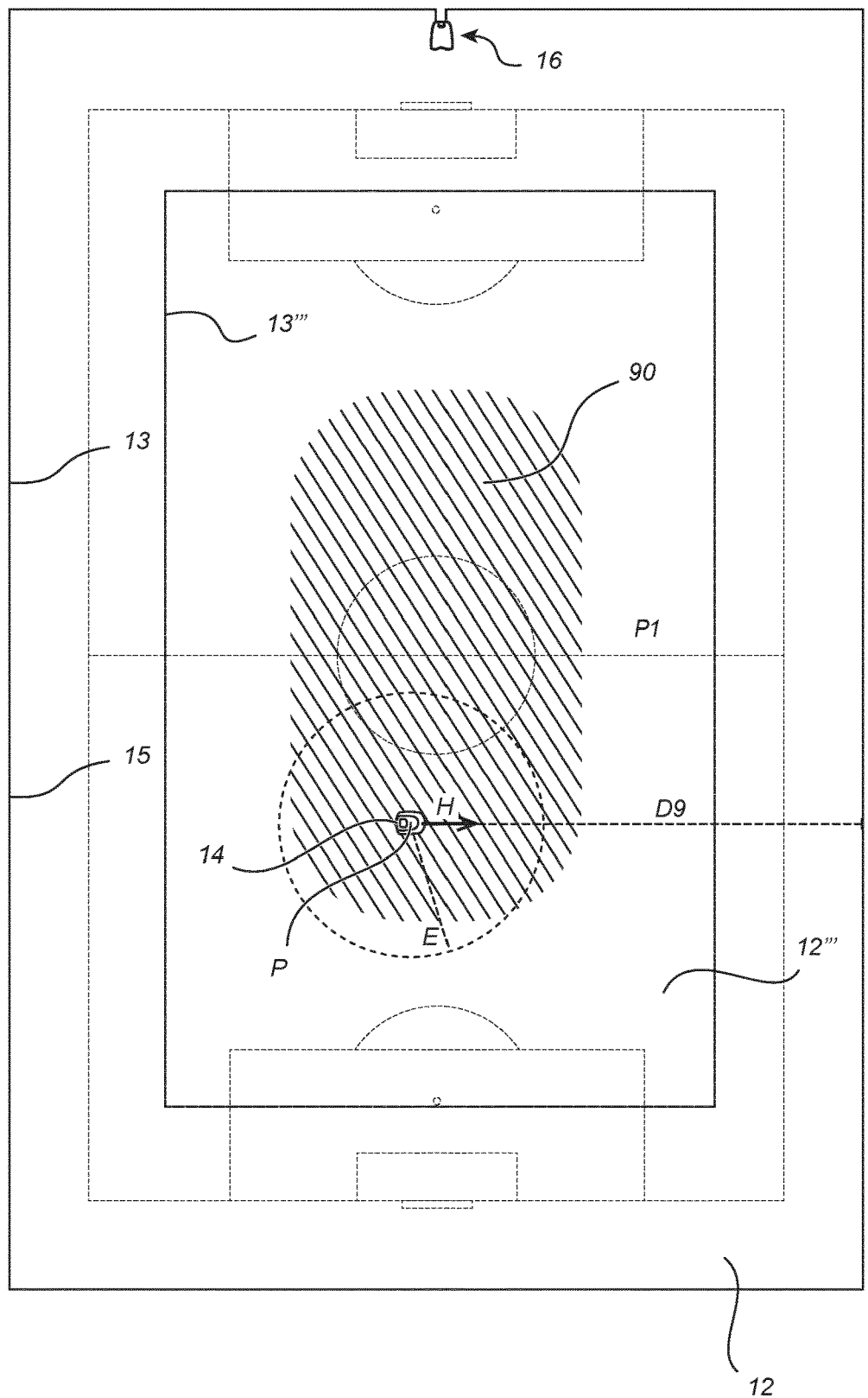
FIG. 10 is a schematic top view of a work area, and illustrates a fourth navigation scenario of the robotic lawnmower.

FIG. 10 illustrates a scenario similar to that of FIG. 9. Again, the robotic tool 14 navigates systematically or semi-systematically by GNSS positioning within a large work area 12 delimited by a boundary wire 15, which is also represented in the robotic tool 14 as a virtual boundary 13.

Again, the boundary wire signal is not receivable by the robotic tool 14 in a central area 90, but by determining that the robotic tool 14 is sufficiently remote from the boundary wire 15, the robotic tool 14 may be allowed to continue operating within the central area 90. The situation of FIG. 10 however differs from the situation of FIG. 9 in that the robotic tool 14 does not determine a distance to the boundary wire 15, and it does not set a maximum dead reckoning navigation distance. Instead, the robotic tool 14 determines, based on GNSS signal reception, a GNSS position P, and estimates a GNSS positioning error E. In the event that a signal from the boundary wire cannot be reliably received, for example when in the centre of a large work area, the robotic tool 14 determines, based on the GNSS position P and the GNSS positioning error E, whether the distance D9 to the boundary wire 15 at least exceeds the positioning error E, and if so, it continues navigating. However, should the positioning error E exceed the distance D9 (i.e. the dashed line of radius E crosses the boundary wire 15), the robotic tool 14 will execute a safety operation such as stopping or turning. Similar to what has been described hereinbefore, the error E may be compared to the distance D9 in the heading direction H, or to the shortest distance from the robotic tool to the boundary wire in any direction.

Figure 11:
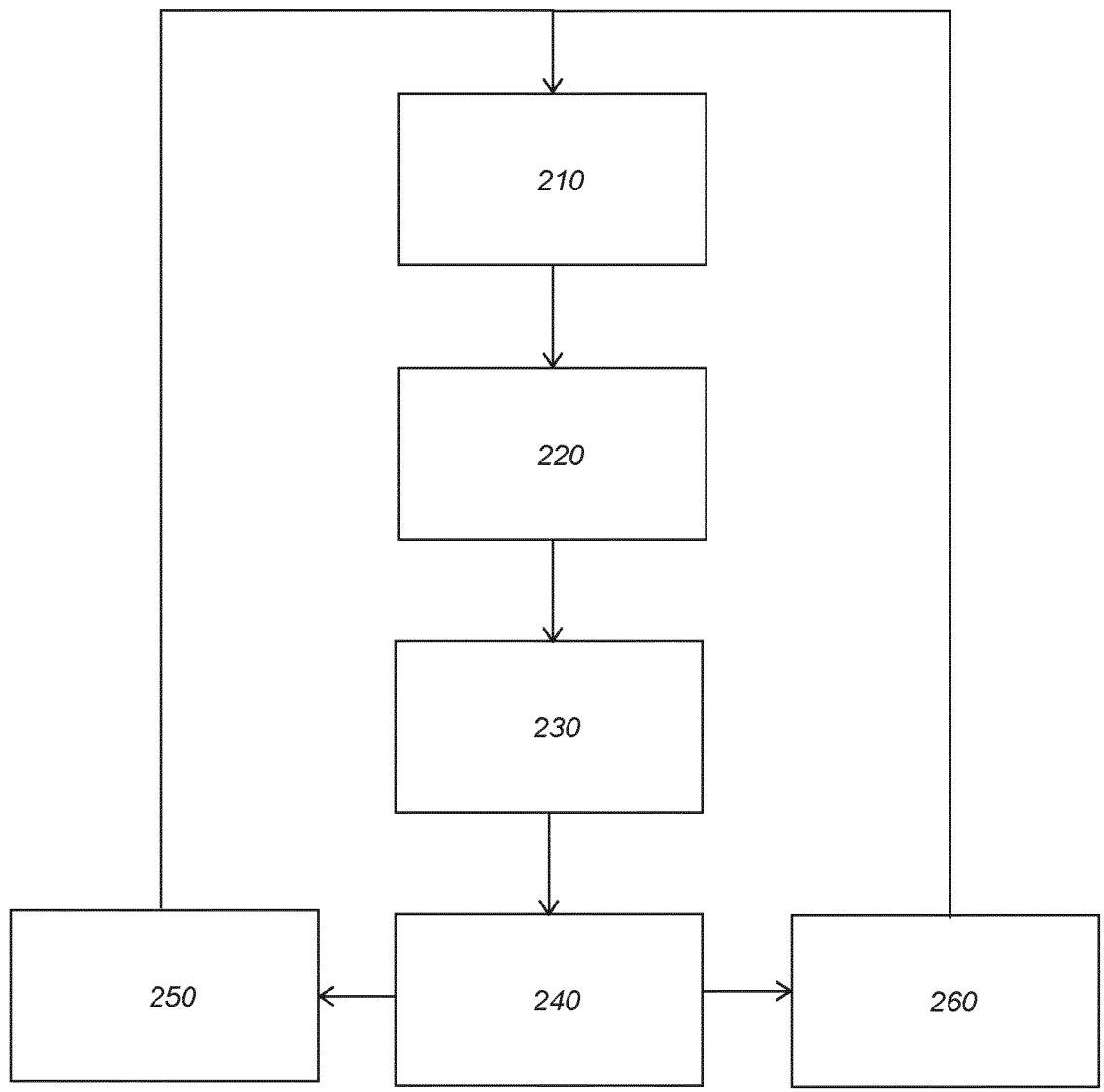
FIG. 11 is a flow chart illustrating a navigation method of the robotic lawnmower in the navigation scenario of FIG. 10.
Figure 12:
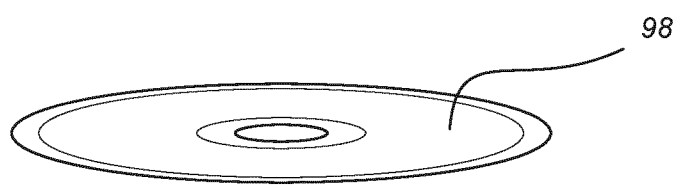
FIG. 12 is a schematic view in perspective of a compact disc.

The method described with reference to FIG. 10 is illustrated in the flow chart of FIG. 11:

In step 210, the robotic tool 14 receives GNSS signals.

In step 220, the robotic tool 14 determines, based on the received GNSS signals, a GNSS position P.

In step 230, the robotic tool 14 estimates, based on the received GNSS signals, a GNSS positioning error E.

In step 240, the robotic tool determines, based on the GNSS position P and the GNSS positioning error E, whether a distance to the boundary 13/boundary wire 15 at least exceeds a limit distance. According to embodiments, the limit distance may be determined based on the GNSS positioning error E; in particular, the limit distance may be set to correspond to the GNSS positioning error E.

If the distance to the boundary 13/boundary wire 15 exceeds said limit distance, the robotic tool 14 continues navigating by propelling itself forward in step 250; else, it executes a safety operation in step 260. The method may then repeat all over again.

The virtual boundary need not necessarily represent the position of the boundary wire 15. Instead, or additionally, a virtual boundary 13''' may be defined separate from the position 13 of the boundary wire 15. By way of example, the virtual boundary 13''' may define a sub-area 12''' within the work area 12, in which sub-area 12''' the robotic tool is allowed to continue operating without a boundary wire signal, based on a condition that its received GNSS position meets a predetermined positioning accuracy requirement.

The methods described herein may be implemented in a computer program, which may be loaded or loadable into the controller 26 for execution. The computer program may be carried by a computer readable medium, such as compact disc, flash memory, or similar device in any manner apparent to those skilled in the art. FIG. 11 illustrates an exemplary portable memory, in the embodiment of a compact disc 98, carrying such a computer program. The compact disc 98 is loadable into a computer (not illustrated) connectable to the robotic tool 14, for transfer of the program to the robotic tool 14.

The invention has mainly been described above with reference to a few embodiments. However, as is readily appreciated by a person skilled in the art, other embodiments than the ones disclosed above are equally possible within the scope of the invention, as defined by the appended patent claims.

For example, the positioning device need not be a GNSS positioning device. Instead, positioning may be based on e.g. local beacons, machine vision, or any other method allowing the robotic tool's present position in the work area to be established in relation to the boundary. For an RTK-GNSS implementation, the wireless correction signal source need not be co-located with a charging unit, but may instead be configured e.g. as a separate RTK beacon.

In the claims, the word "comprising" does not exclude other elements or steps, and the indefinite article "a" or "an" does not exclude a plurality.

The invention claimed is:

1. A method of navigating a self-propelled robotic tool within a work area defined by a boundary, the method comprising:
    determining a positioning status of the robotic tool, the positioning status comprising a determined position of the robotic tool within the work area;
    navigating the robotic tool based on the determined positioning status;
    determining that a new positioning status of the robotic tool within the work area cannot be reliably obtained;
    based on the determined position of the robotic tool within the work area, estimating a boundary distance value indicative of a distance from the robotic tool to the boundary;
    setting a maximum dead reckoning navigation distance based on the boundary distance value;
    continuing navigating the robotic tool based on dead reckoning; and
    if no new positioning status of the robotic tool within the work area has been reliably obtained upon reaching the maximum dead reckoning navigation distance, executing a safety operation based on having reached the maximum dead reckoning navigation distance,
    wherein the boundary comprises a plurality of boundary segments, each boundary segment associated with a boundary classification,
    wherein the method further comprises identifying a selected subset of said boundary segments based on boundary classification, and wherein estimating the boundary distance value indicative of the distance from the robotic tool to the boundary comprises estimating the boundary distance value based on the classification of said selected subset.

2. The method according to claim 1, wherein executing the safety operation comprises stopping propulsion of the robotic tool.

3. The method according to claim 1, wherein executing the safety operation comprises stopping a work implement of the robotic tool.

4. The method according to claim 1, wherein executing the safety operation comprises changing heading of the robotic tool.

5. The method according to claim 1, wherein determining the positioning status of the robotic tool comprises receiving a wireless positioning signal.

6. The method according to claim 5, wherein receiving the wireless positioning signal comprises receiving a satellite navigation signal.

7. The method according to claim 1, wherein determining that the new positioning status of the robotic tool within the work area cannot be reliably obtained comprises:
reliably receiving a wireless positioning signal;
setting a start value of a counter;
increasing or decreasing the value of the counter; and
if no wireless positioning signal has yet been received when the counter has reached a limit value, determining that the new positioning status of the robotic tool within the work area cannot be reliably obtained.

8. The method according to claim 1, wherein the boundary distance value is based on a shortest distance from the determined position to the boundary.

9. The method according to claim 1, wherein
the positioning status of the robotic tool further comprises a determined heading of the robotic tool; and
the estimation of the boundary distance value is further based on the determined heading.

10. The method according to claim 9, further comprising:
based on said determined heading, identifying boundary segments within a navigation sector comprising the determined heading, wherein
the estimation of the boundary distance value is further based on said identification of boundary segments within the navigation sector.

11. The method according to claim 9, wherein
the boundary distance value is indicative of the distance from the robotic tool to the boundary in direction of the determined heading.

12. The method according to claim 1, wherein continuing navigating the robotic tool based on dead reckoning comprises:
triggering, based on sensor input, a heading change; and
based on said heading change, changing the maximum dead reckoning navigation distance.

13. The method according to claim 1, wherein estimating the boundary distance value indicative of the distance from the robotic tool to the boundary comprises estimating a plurality of boundary distance values indicative of a respective plurality of distances from the robotic tool to the boundary.

14. The method according to claim 1, wherein the boundary is a virtual boundary defined by GNSS coordinates.

15. The method according to claim 1, wherein the boundary is defined by a boundary wire emitting a boundary wire signal.

16. A method of navigating a robotic tool within a work area defined by a boundary wire, the method comprising:
determining that a signal from the boundary wire cannot be reliably received;
determining a GNSS position;
estimating a GNSS positioning error;
based on the GNSS position and the GNSS positioning error, determining a distance value representing a distance to a boundary;
setting a maximum navigation distance based on the boundary distance value;
continuing navigating the robotic tool; and
if no signal from the boundary wire has been reliably received upon reaching the maximum navigation distance, executing a safety operation based on having reached the maximum navigation distance,
wherein the boundary comprises a plurality of boundary segments, each boundary segment associated with a boundary classification,
wherein the method further comprises identifying a selected subset of said boundary segments based on boundary classification, and
wherein determining the distance value representing the distance to the boundary comprises estimating the distance value based on the classification of said selected subset.

17. A self-propelled robotic tool comprising:
a positioning device configured to determine a position of the robotic tool within a work area;
a dead reckoning device configured to generate a movement signal indicative of a movement of the robotic tool relative to a known starting position;
and a controller configured to operate the robotic tool in accordance with operations including:
determining a positioning status of the robotic tool, the positioning status comprising the determined position of the robotic tool within the work area;
navigating the robotic tool based on the determined positioning status;
determining that a new positioning status of the robotic tool within the work area cannot be reliably obtained;
based on the determined position of the robotic tool within the work area, estimating a boundary distance value indicative of a distance from the robotic tool to the boundary;
setting a maximum dead reckoning navigation distance based on the boundary distance value;
continuing navigating the robotic tool based on dead reckoning; and
if no new positioning status of the robotic tool within the work area has been reliably obtained upon reaching the maximum dead reckoning navigation distance, executing a safety operation based on having reached the maximum dead reckoning navigation distance,
wherein the boundary comprises a plurality of boundary segments, each boundary segment associated with a boundary classification,
wherein the method further comprises identifying a selected subset of said boundary segments based on boundary classification, and
wherein estimating the boundary distance value indicative of the distance from the robotic tool to the boundary comprises estimating the boundary distance value based on the classification of said selected subset.

18. The robotic tool according to claim 17, wherein the positioning device comprises a GNSS receiver.

19. The robotic tool according to claim 17, wherein the robotic tool is a robotic lawnmower.

\* \* \* \* \*